(12) United States Patent
Haselhuhn et al.

(10) Patent No.: US 11,471,972 B2
(45) Date of Patent: Oct. 18, 2022

(54) COMBINED STACKUP APPARATUS FOR RESISTANCE SPOT WELDING

(71) Applicant: GM Global Technology Operations LLC, Detroit, MI (US)

(72) Inventors: Amberlee S. Haselhuhn, Troy, MI (US); David R Sigler, Shelby Township, MI (US); Robert T Szymanski, Saint Clair Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 133 days.

(21) Appl. No.: 16/723,162

(22) Filed: Dec. 20, 2019

(65) Prior Publication Data

US 2021/0187653 A1 Jun. 24, 2021

(51) Int. Cl.
*B23K 11/11* (2006.01)
*B23K 11/20* (2006.01)
*B23K 11/18* (2006.01)
*B23K 103/20* (2006.01)

(52) U.S. Cl.
CPC ........... *B23K 11/115* (2013.01); *B23K 11/185* (2013.01); *B23K 11/20* (2013.01); *B23K 2103/20* (2018.08)

(58) Field of Classification Search
CPC ..... B23K 11/115; B23K 11/185; B23K 11/20; B23K 2103/20
USPC ....................................................... 219/91.2
See application file for complete search history.

(56) References Cited

U.S. PATENT DOCUMENTS

| 6,074,764 A * | 6/2000 | Takayasu ................ B32B 15/01 |
|---|---|---|
| | | 428/614 |
| 2016/0200074 A1* | 7/2016 | Lang .................... B23K 26/323 |
| | | 428/576 |
| 2017/0232548 A1* | 8/2017 | Carlson ................. B23K 11/115 |
| | | 219/91.2 |
| 2017/0291253 A1* | 10/2017 | Hahnlen ............... B23K 11/115 |

FOREIGN PATENT DOCUMENTS

| CN | 1189798 A | 8/1998 |
|---|---|---|
| CN | 107771114 A | 3/2018 |
| CN | 107824951 A | 3/2018 |
| CN | 108349217 A | 7/2018 |
| JP | 2007276295 A | 10/2007 |
| JP | 2016059954 A | 4/2016 |

OTHER PUBLICATIONS

Translation of cited CN 118798 (Year: 1998).*

* cited by examiner

*Primary Examiner* — Dana Ross
*Assistant Examiner* — Joseph W Iskra
(74) *Attorney, Agent, or Firm* — Vivacqua Crane PLLC

(57) ABSTRACT

A combined stackup apparatus with a perforated interlayer for resistance spot welding is provided. The apparatus comprises a first metal sheet of a first material and a second metal sheet of a second material. The apparatus further comprising a perforated interlayer disposed between the first metal layer and the second metal layer. The perforated interlayer is made of one of the first and second materials. The perforated interlayer has a plurality of perforations formed therethrough. Each perforation has a perforation size of between about 0.1 mm and about 3 mm.

4 Claims, 3 Drawing Sheets

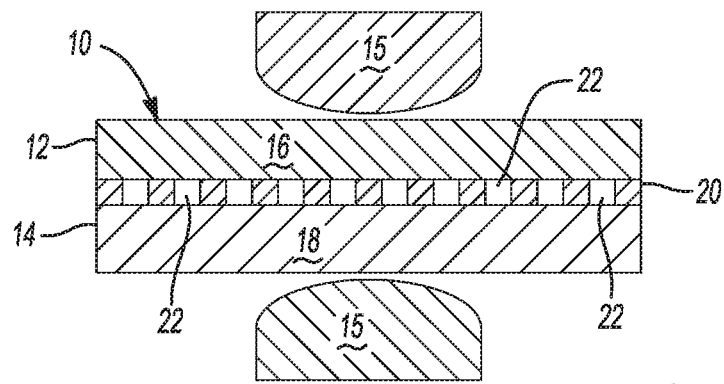
FIG. 1
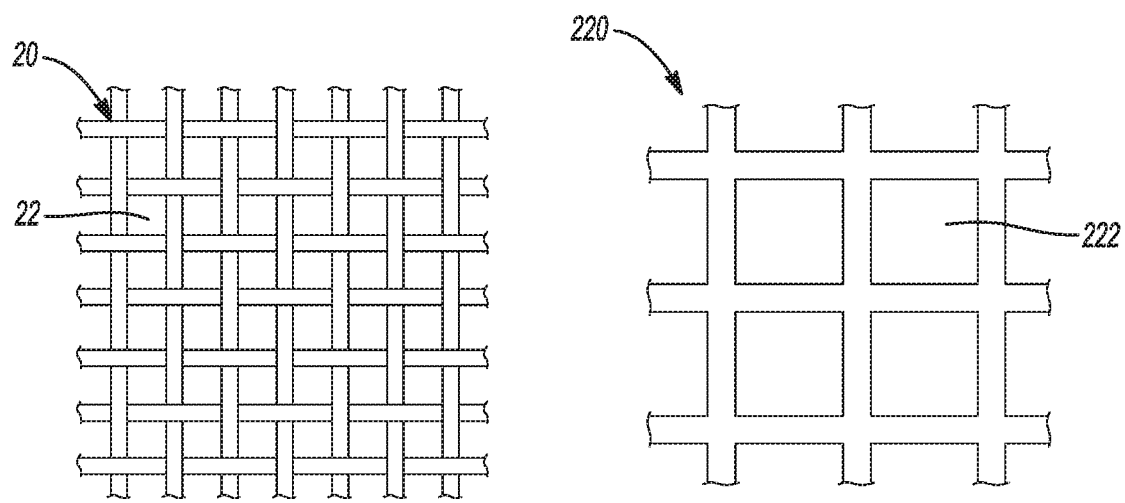
FIG. 2a
FIG. 2b
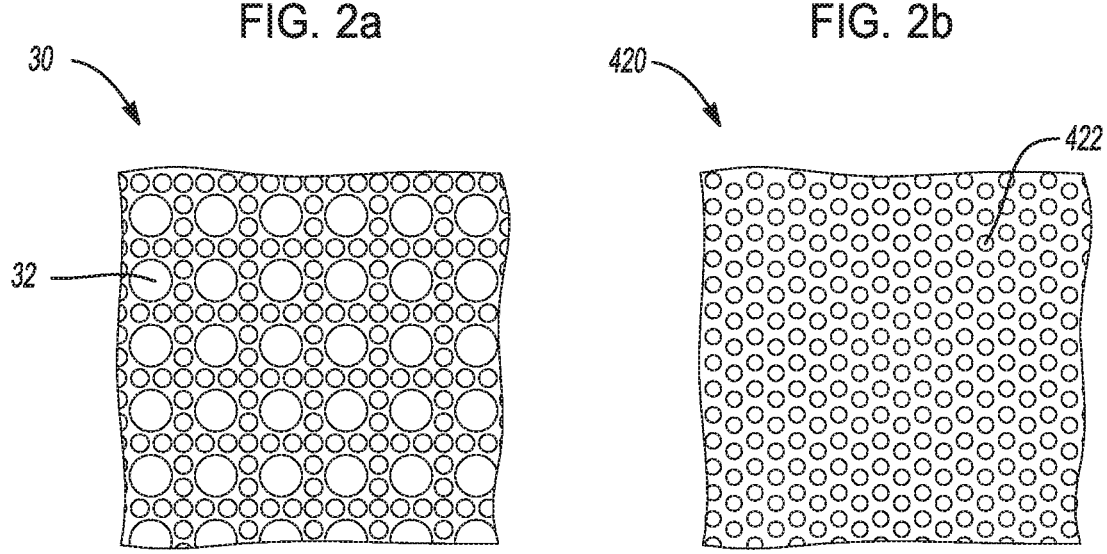
FIG. 2c
FIG. 2d

COMBINED STACKUP APPARATUS FOR RESISTANCE SPOT WELDING

INTRODUCTION

The present disclosure relates to apparatus for welding. More particularly, the present disclosure relates to combined stackup apparatus for resistance spot welding and welded stackup apparatus from resistance spot welding.

In several industries, including the automotive industry, a welding process is used to join structures together. During welding, several undesirable phenomena may occur including expulsion of the structures which may form sharp whiskers at the faying interface, sharp notch roots around the weld nugget, cracks within the structure around the welds, and undesirable heat affected zones (HAZ). Complications related to both joint strength of the welded structures and manufacturing may result.

SUMMARY

Thus, while current apparatus and processes achieve their intended purpose, there is a need for a new and improved combined stackup apparatus and method of making combined stackup apparatus.

According to one aspect of the present disclosure, a combined stackup apparatus for resistance spot welding for a vehicle is provided. The apparatus comprises a first metal sheet or workpiece of a first material and a second metal sheet or workpiece of a second material. The apparatus further comprises a perforated interlayer disposed between the first metal workpiece and the second metal workpiece. The perforated interlayer is made of one of the first and second materials. The perforated interlayer sheet has a plurality of perforations formed therethrough. Each perforation has a perforation size of between about 0.1 mm and about 3 mm. Each perforation has an area of between 0.007 mm$^2$ and 7 mm$^2$.

In one embodiment, the perforated interlayer has a total area and an open area. The open area is between about 20% and about 80% of the total area of the perforated interlayer. Alternatively, the perforation size is between about 0.25 mm and 1.5 mm. Each perforation has an area preferably between 0.05 mm$^2$ and 1.8 mm$^2$.

For one example, the first metal workpiece is comprised of one of steel and aluminum and the second metal workpiece is comprised of one of steel and aluminum. In another example, the first metal workpiece and the second metal workpiece are comprised of steel and the perforated layer is comprised of steel. In yet another example, the first metal workpiece and the second metal workpiece are comprised of aluminum and the perforated layer is comprised of one of aluminum and steel. In still another example, the first metal workpiece is comprised of aluminum and the second metal workpiece is comprised of steel and wherein the perforated interlayer is comprised of steel.

In another embodiment, the perforated interlayer comprises up to about 5% of Si, Cr, Mg, Ti, Zn or mixtures thereof.

In another aspect of the disclosure, a welded stackup apparatus from resistance spot welding is provided. The apparatus comprises a first metal sheet of a first material and a second metal sheet of a second material. The apparatus further comprises a perforated interlayer disposed between the first metal layer and the second metal layer. The perforated interlayer is made of one of the first and second materials. The perforated interlayer sheet has a plurality of perforations formed therethrough. The apparatus further comprises a weld nugget formed within at least one of the plurality of perforations of the perforated interlayer between the first and second metal sheets.

In one embodiment, the perforated interlayer has a total area and an open area. The open area is between about 20% and about 80% of the total area of the perforated interlayer.

In another embodiment, each perforation has a perforation size of between about 0.1 mm and about 3 mm.

In one example, the first metal workpiece is comprised of one of steel and aluminum, and the second metal workpiece is comprised of one of steel and aluminum. In another example, the first metal workpiece and the second metal workpiece are comprised of steel and wherein the perforated layer is comprised of steel. In yet another example, the first metal workpiece and the second metal workpiece are comprised of aluminum, and the perforated interlayer is comprised of one of aluminum and steel. In still another example, the first metal workpiece is comprised of aluminum and the second metal workpiece is comprised of steel, and the perforated interlayer is comprised of steel.

In another embodiment, the perforated interlayer comprises up to about 5% of Si, Cr, Mg, Ti, Zn or mixtures thereof.

In another aspect of the present disclosure, a method of welding a combined stackup apparatus is provided. The method comprises providing a first metal workpiece of a first material and a second metal workpiece of a second material. The method further comprises providing a perforated interlayer disposed between the first and second metal layers. The perforated interlayer is made of one of the first and second materials. The perforated interlayer sheet has a plurality of perforations formed therethrough. Each perforation has a perforation size of between about 0.1 mm and about 3 mm. The perforated interlayer defines a weld area. The method further comprises spot welding the weld area for controlled expulsion defining a faying interface within the perforated interlayer and a spot welded nugget formed within the faying interface.

In one embodiment, the step of spot welding comprises containing heat within the faying interface to control expulsion of the spot welded nugget.

In another embodiment, the step of spot welding comprises forming the spot welded nugget within one perforation of the perforated interlayer.

In yet another embodiment, each perforation has a perforation size of between about 0.1 mm and about 3 mm. In this embodiment, the perforated interlayer comprises a total area and the spot welded nugget comprising a nugget area. The total area is greater than the nugget area by at least about 25%.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is side cross-sectional schematic view of a combined stackup apparatus for resistance spot welding in accordance with one embodiment of the present disclosure.

FIGS. 2a-2d are plan views of perforated interlayers for the combined stackup apparatus in FIG. 1.

DETAILED DESCRIPTION

Figure 3:
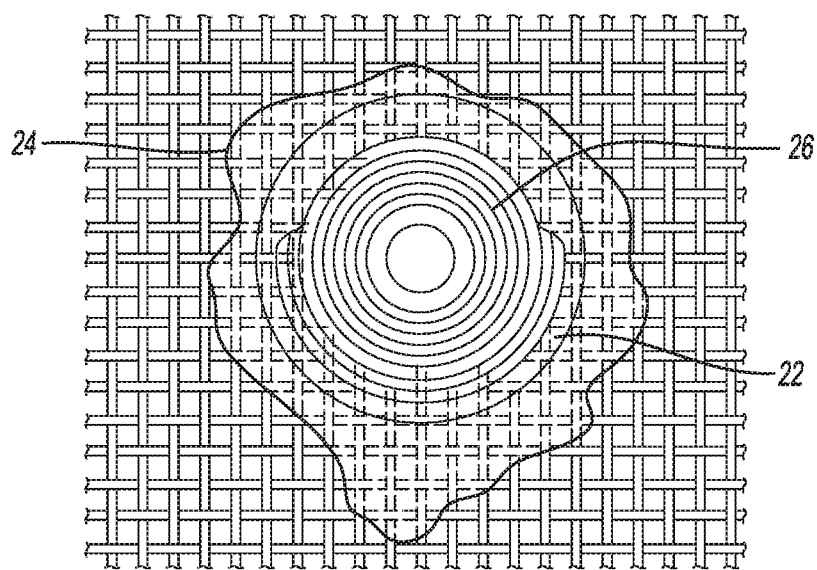
FIG. 3 is a top view of a weld nugget formed on one of the perforated interlayers in FIGS. 2a-2d according to an exemplary embodiment.

The following description is merely exemplary in nature and is not intended to limit the present disclosure, application, or uses.

In accordance with one embodiment of the present disclosure, FIG. 1 illustrates a combined stackup apparatus 10 preferably for resistance spot welding (RSW). The combined stackup apparatus 10 allows for reduction of expulsion (flash), improved weld joint ductility and strength, and improved heat affected zone formation during RSW. As shown, the combined stackup apparatus 10 comprises a first metal sheet or workpiece 12 and a second metal sheet or workpiece 14 disposed adjacent the first metal workpiece 12. As shown, the first and second metal workpieces 12, 14 are contacted or flanked by a pair of electrodes 15 of a welding system (not shown) preferably for resistance spot welding. Preferably, each of the first metal workpiece 12 and the second metal workpiece 14 is a solid metal workpiece to be joined together by way of resistance spot welding. However, it is understood that other types of welding may be applicable without departing from the spirit or scope of the present disclosure.

The first metal workpiece 12 comprises a first material 16 and the second metal workpiece 14 comprises a second material 18. The first material 16 may be one of aluminum alloy and steel, and the second material 18 may be one of aluminum alloy and steel. Thus, the first and second metal layers 16,18 may be an aluminum-aluminum combination (i.e., both first and second metal workpieces 16,18 are made of aluminum alloy), a steel-steel combination (i.e., both first and second metal workpiece 16,18 are made of steel), or an aluminum-steel combination (i.e., the first metal workpiece is made of aluminum and the second workpiece is made of steel). It is understood that each of the first and second metal workpieces 16,18 may include aluminum and its alloys, magnesium and its alloys, steel, stainless steel, copper, titanium or any other suitable material without departing from the scope or spirit of the present disclosure. Moreover, such alloys may be, but are not necessarily limited to aluminum alloys of the 1000 series, 2000 series, 3000 series, 5000 series, 6000 series, and 7000 series. Furthermore, where the workpieces are steel, i.e., iron alloyed with carbon, such steel may include steel materials such as low carbon steel, high strength low alloy (HSLA) steel, dual-phase steel (for example, DP600 or DP780), TRIP steels, Gen 3 steels, and PHS steels without departing from the scope or spirit of the present disclosure.

As shown, the apparatus further comprises a perforated interlayer 20 disposed between the first metal workpiece 12 and the second metal workpiece 14. The perforated interlayer 20 is preferably electrically conductive or metallic. In this embodiment, the perforated interlayer 20 may be made of one of the first and second materials 16,18. Additionally, the perforated interlayer 20 may be coated or comprised of aluminum and its alloys, magnesium and its alloys, steel, stainless steel, copper, titanium or any other suitable material without departing from the scope or spirit of the present disclosure. For improved joint strength, the perforated interlayer 20 may be impregnated with coatings or particles such as but not limited to up to about 5 weight percent of silicon, chromium, magnesium, titanium, zinc, or any other suitable coatings or particles without departing from the spirit or scope of the present disclosure.

In this embodiment, the perforated interlayer 20 has a thickness less than each of the first metal sheet 12 and the second metal sheet 14. Referring to FIGS. 1-2a, the perforated interlayer 20 has a plurality of perforations 22 formed therethrough. The perforated interlayer 20 may be woven metallic wire cloth or a perforated metal sheet to form the plurality of perforations 22. Each perforation 22 may have a perforation size of between about 0.1 mm and about 3 mm, and more preferably between about 0.25 mm to about 1.5 mm. The area of each perforation is between 0.007 $mm^2$ and 7 $mm^2$ and preferably between 0.05 $mm^2$ and 1.8 $mm^2$.

In one embodiment, the perforated interlayer 20 has a total area and an open area. The total area may be defined as an area over which the perforated interlayer encompasses. The open area may be defined as a combined area of the plurality of perforations 22 of the perforated interlayer 20. In this embodiment, the open area is between about 20% and about 80% of the total area of the perforated interlayer 20, and more preferably between about 35% and about 65% of the total area of the perforated interlayer 20.

It is understood that the perforated interlayer 20 may include aluminum and its alloys, magnesium and its alloys, steel, stainless steel, copper, titanium or any other suitable material without departing from the scope or spirit of the present disclosure. Moreover, such alloys may be, but are not necessarily limited to aluminum alloys of the 1000 series, 2000 series, 3000 series, 5000 series, 6000 series, and 7000 series. Furthermore, where the perforated interlayer is steel, i.e., iron alloyed with carbon, such steel may include steel materials such as low carbon steel, high strength low alloy (HSLA) steel, dual-phase steel (for example, DP600 or DP780), TRIP steels, Gen 3 steels, and PHS steels without departing from the scope or spirit of the present disclosure.

In this embodiment, when the first and second metal workpieces 12,14 is an aluminum-aluminum combination, i.e., both the first and second workpieces 12,14 are aluminum workpieces, the perforated interlayer 20 may be made of either aluminum or steel. When the first and second metal workpieces 12,14 is a steel-steel combination, the perforated interlayer 20 is preferably made of steel. When the first and second metal workpieces 12,14 is an aluminum-steel combination, the perforated interlayer 20 is preferably made of steel. It is to be understood that the perforated interlayer 20 may be coated or comprise up to about 5% of Si, Cr, Mg, Ti, Zn or mixtures thereof without departing from the spirit or scope of the present disclosure.

It is understood that the perforated interlayer may be woven metallic wire cloth (FIG. 2a) or a perforated metal sheet as depicted in FIGS. 2b-2d. For example, FIG. 2b illustrates a perforated interlayer 220 having a plurality of perforations 222, FIG. 2c depicts a perforated interlayer 320 having a plurality of perforations 322, and FIG. 2d illustrates a perforated interlayer 420 having a plurality of perforations 422. Each perforated interlayer 220, 320, 420 may be used in any of the apparatus and method examples described herein without departing from the spirit or scope of the present disclosure. Furthermore, it is understood that the plurality of perforations may take on any suitable shape without departing from the spirit or scope of the present disclosure. It is also understood that the perforations may be distributed in a less symmetrical fashion than shown in FIG. 2 without departing from the spirit or scope of the present disclosure.

As shown in FIG. 3, upon welding the combined stackup apparatus 10 at a faying interface 24, the method of which is described below, a weld joint 26 is formed at the faying interface 24 within at least one of the plurality of perforations 22 between the first and second metal workpieces 12,14.

Figure 4A:
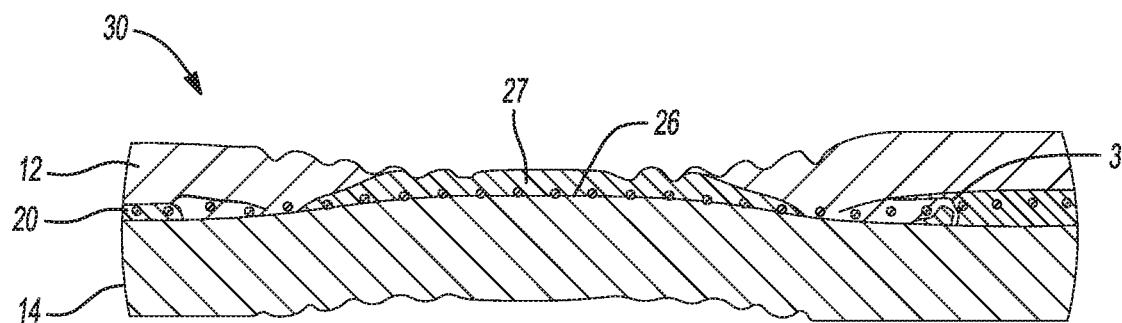
FIGS. 4a and 4b are cross-sectional side views of a welded stackup apparatus with dissimilar metal from spot welding according to the embodiment of FIG. 1.
Figure 4B:
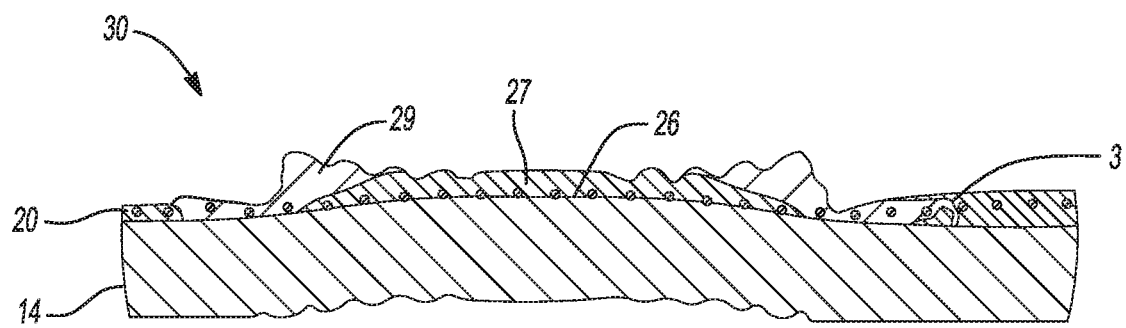

As illustrated in FIGS. 4a-4b, such welding defines a welded stackup apparatus 30. In this embodiment, first metal workpiece 12 comprises a first material, e.g. aluminum or aluminum alloy, and the second metal workpiece 14 comprises a second material, e.g., steel or steel alloy. Thus, in this embodiment, the first material is dissimilar to the second material. In this example, the perforated interlayer 20 is incorporated within a weld nugget 27 during welding. In this embodiment, several benefits are obtained by using the interlayer.

First, remnants of the perforated interlayer 20 incorporated within the weld nugget 27 can act as a crack deflector when the weld joint 26 is subject to loading thereby providing enhanced robustness of the apparatus 30. Second, the perforated interlayer 20 facilitates in controlling expulsion (flash) thereby minimizing sharp formations (sharp whiskers). Third, welding with the perforated interlayer 20 creates blunt notch roots 32 around the weld nugget 27, providing stronger, more robust weld joints 26. That is, notch root angles 32 of the weld nugget 27 will be blunt thereby minimizing stress at the faying interface 24 and improving weld joint strength. Such blunt formation of the weld nugget 27 is created by the gap provided by the perforated interlayer 20 at the faying interface which, during welding prevents intimate layer-to-layer contact just outside of the growing weld nugget 27, thus, blunting the notch root 32. Fourth, the location of the perforated interlayer 20 at the faying interface between the metal layers 12,14 concentrates heat in that location, thus, allowing the use of cooler weld schedules that help mitigate weld cracking and also improve HAZ formation strengthening the joint.

Referring to FIG. 4b, mechanical testing as known in the art is performed on the welded stackup apparatus 30. After mechanical testing, a weld button 29 is usually left attached to the welded stackup apparatus 30. As shown, a portion of the first metal workpiece 12 is torn from apparatus 30 as a result of mechanical testing. Moreover, the weld nugget 27 and weld button 29 remains thereon.

It is to be understood that the present disclosure is applicable to two or more metal sheets to be joined by welding. By way of example, the first metal sheet and the second metal sheet are discussed herein even though more than two metal sheets may be joined without departing from the spirit or scope of the present disclosure.

Figure 5A:
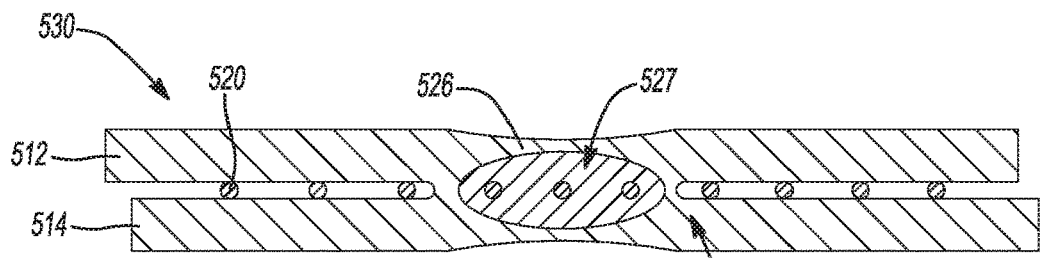
FIGS. 5a and 5b are schematic cross-sectional side views of a welded stackup apparatus with similar metal from spot welding according to another embodiment of the present disclosure.
Figure 5B:
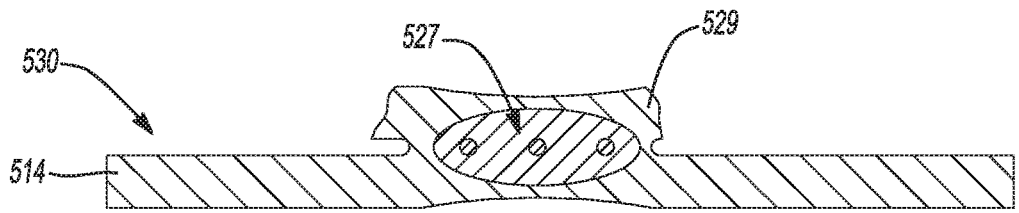

As depicted in FIGS. 5a-5b, such welding defines a welded stackup apparatus 530. In this embodiment, first metal workpiece 512 comprises a first material and the second metal workpiece 514 comprises a second material wherein the first and second materials are similar. For example, the first and second materials may be aluminum, aluminum alloy, steel, steel alloy, or any other suitable material without departing from the scope or spirit of the present disclosure. In this example, the remnants of the perforated interlayer 520 is incorporated within a weld nugget 527 during welding. In this embodiment, the benefits discussed above are also obtained by using the perforated interlayer 520 in this embodiment.

Referring to FIG. 5b, mechanical testing as known in the art is performed on the welded stackup apparatus 530. After mechanical testing, a weld button 529 is left attached to the welded stackup apparatus 530. As shown, a portion of the first metal workpiece 512 is torn from apparatus 530 as a result of mechanical testing. Moreover, the weld nugget 527 and weld button 529 remains thereon.

Figure 6A:
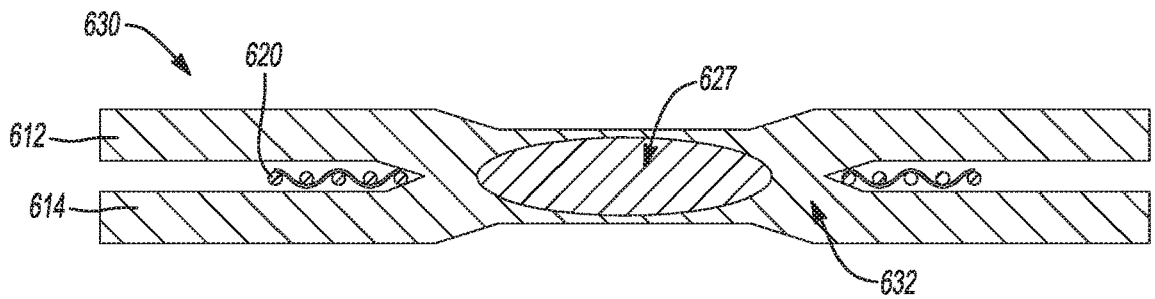
FIGS. 6a and 6b are schematic cross-sectional side views of a welded stackup apparatus with similar metal from spot welding according to yet another embodiment.
Figure 6B:
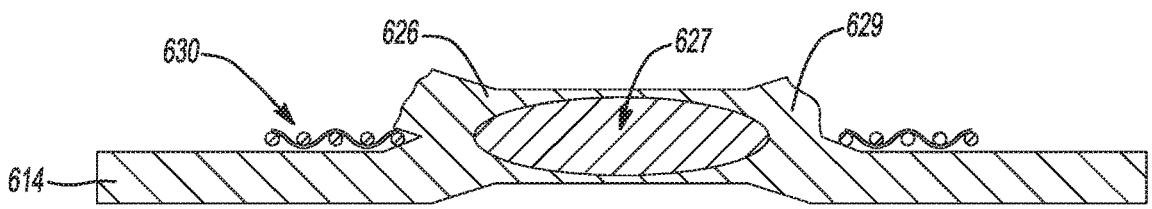

As depicted in FIGS. 6a-6b, such welding defines a welded stackup apparatus 630. In this embodiment, first metal workpiece 612 comprises a first material and the second metal workpiece 614 comprises a second material wherein the first and second materials are similar. For example, the first and second materials may be aluminum, aluminum alloy, steel, steel alloy, or any other suitable material without departing from the scope or spirit of the present disclosure. In this example, the perforated interlayer 620 is consumed within a weld nugget 627 during welding. In this embodiment, the benefits discussed above are also obtained by using the perforated interlayer 620 in this embodiment.

Referring to FIG. 6b, mechanical testing as known in the art is performed on the welded stackup apparatus 630. After mechanical testing, a weld button 629 is left attached to the welded stackup apparatus 630. As shown, a portion of the first metal workpiece 612 is torn from apparatus 630 as a result of mechanical testing. Thus, the weld nugget 627 and weld button 629 remains thereon.

Figure 7:
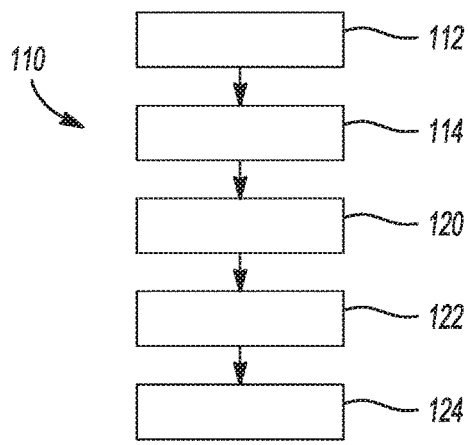
FIG. 7 is a method of welding a combined stackup apparatus in accordance with one example of the present disclosure.

FIG. 7 depicts a flowchart 110 of a method of making the welded stackup apparatus preferably from resistance spot welding (RSW). As shown, the method comprises providing a first metal workpiece of a first material and a second metal workpiece of a second material (as described above) in box 112. The method further comprises providing a perforated interlayer (as described above) disposed between the first and second metal layers in box 114.

As mentioned above, the perforated interlayer 20 is made of one of the first and second materials. The perforated interlayer 20 has a plurality of perforations formed therethrough. Each perforation has a perforation size of between about 0.1 mm and about 3 mm. The area of each perforation is between 0.007 mm$^2$ to 7 mm$^2$. The perforated interlayer defines a weld area.

The method further comprises spot welding the weld area in box 120 defining a faying interface within the perforated interlayer and a welded nugget formed within the faying interface. As mentioned above, the benefits of using the perforated interlayer includes crack deflection, expulsion control, formation of blunt notch roots, crack reduction, and improving HAZ. Spot welding or resistance spot welding (RSW) is a process in which contacting metal surface points are joined by the heat obtained from resistance to electric current. In RSW, workpieces such as the first and second metal sheets mentioned above are held together under pressure exerted by electrodes. Typically, the workpieces may range in thickness from 0.5 mm to 5.0 mm preferably from 0.8 mm to 3 mm. The RSW process uses two shaped metal ahoy electrodes to concentrate welding current into a small "spot" and to simultaneously clamp the sheets together. In one embodiment, the electrodes preferably but not necessarily be of copper alloys with greater than about 98% copper or a copper tungsten powder metal material with greater than about 25% copper, Forcing a large current through the spot will melt the metal at the faying interface, which after solidification forms the weld nugget mentioned above. One feature of spot welding is that energy can be delivered to the spot in a relatively short time. The process permits the welding to occur without excessive heating of the remainder of the metal sheets.

In this example of the present disclosure, the step 120 of spot welding comprises concentrating heat within the faying interface to form the welded nugget in box 122. In the embodiment described above and in this example, at least one of the first and second metal sheets melts at the faying interface during welding. In turn, the weld nugget is formed. Thus, the weld nugget may be comprised of one of the first material and the second material, or both.

The heat is concentrated by way of at least one of the plurality of perforations of the perforated interlayer. In this example, the step of spot welding comprises forming the welded nugget within one perforation of the perforated interlayer in box 124. Once the weld joint has formed and solidified the perforated interlayer can act as a crack deflector under load thereby providing enhanced robustness of the welded stackup apparatus. In this example, the perforated interlayer also facilitates in controlling expulsion (flash) thereby minimizing sharp whiskers extending from the faying interface providing a blunt notch root 32 with minimal to no sharp whiskers. Such a blunt notch root 32 improves mechanical robustness of the joint by reducing stress concentrations. Finally, use of the perforated interlayer to form the weld nugget during welding, concentrates heat at the faying interface between the first and second metal sheets, thus allowing use of cooler weld schedules that help prevent weld cracking and undesirable HAZ formation from excessive heat.

It is to be understood that the perforated interlayer 20 may or may not be consumed by the welding process without departing from the spirit or scope of the present disclosure. For example, in an aluminum-aluminum combination or an aluminum-steel combination, the perforated interlayer 20 (preferably made of steel) may not be melted or consumed. On the other hand, in a steel-steel combination, the perforated interlayer 20 (preferably made of steel) may be partially or fully melted depending on the weld temperature.

Generally, the perforated interlayer 20 may be consumed (melted) by the metal sheets being welded if the melting temperature of the perforated interlayer is less than or similar to that of the metal workpieces. In such case, the perforated interlayer 20 may only be visible at weld edges. Moreover, the perforated interlayer 20 may not be consumed and remain intact despite being surrounded by molten metal if the perforated interlayer 20 melting temperature is greater than that of the metal sheets. In such case, the perforated interlayer 20 may be fully or partially visible throughout the welded apparatus, i.e., at the faying interface and at the weld edges.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A welded stackup apparatus from resistance spot welding, the apparatus comprising:
   a first metal workpiece of steel;
   a second metal workpiece of steel;
   a perforated metal interlayer disposed between the first metal workpiece and the second metal workpiece, the perforated metal interlayer being made of steel, the perforated metal interlayer having a plurality of perforations formed therethrough, wherein the perforated metal interlayer has a total area and an open area, the open area being about 80% of the total area of the perforated metal interlayer, and wherein each perforation has a perforation size of between about 0.1 mm and about 3 mm, and wherein each perforation has an area of between 0.007 mm$^2$ and 7 mm$^2$; and
   a weld nugget disposed within at least one of the plurality of perforations of the perforated metal interlayer between the first and second metal workpieces, and wherein the perforated metal interlayer disposed at the weld nugget is consumed within the weld nugget.

2. The apparatus of claim 1 wherein the perforated metal interlayer comprises up to about 5% of Si, Cr, Mg, Ti, Zn or mixtures thereof.

3. A method of welding a combined stackup apparatus, the method comprising:
   providing a first metal workpiece of a first material and a second metal workpiece of a second material;
   providing a perforated interlayer disposed between the first and second metal workpieces, the perforated interlayer being made of one of the first and second materials, the perforated interlayer having a plurality of perforations formed therethrough, each perforation having a perforation size of between about 0.1 mm and about 3 mm, the perforated interlayer defining a weld area; and
   spot welding the weld area for controlled expulsion defining a faying interface within the perforated interlayer and a spot welded nugget formed within the faying interface, wherein the spot welded nugget is formed within one perforation of the perforated interlayer, wherein the perforated interlayer comprises a total area and the spot welded nugget comprising a nugget area, the total area being greater than the nugget area by at least about 25%.

4. The method of claim 3 wherein the step of spot welding comprises:
   containing heat within the faying interface to control expulsion of the spot welded nugget.

* * * * *